United States Patent [19]

Liles et al.

[11] Patent Number: 5,624,997
[45] Date of Patent: *Apr. 29, 1997

[54] PRECURED SILICONE EMULSION

[75] Inventors: Donald T. Liles, Midland, Mich.; Nick E. Shephard, Blacksburg, Va.

[73] Assignee: Dow Corning Corporation, Midland, Mich.

[*] Notice: The term of this patent shall not extend beyond the expiration date of Pat. No. 5,438,095.

[21] Appl. No.: 369,194

[22] Filed: Jan. 5, 1995

Related U.S. Application Data

[63] Continuation-in-part of Ser. No. 113,029, Aug. 30, 1993, Pat. No. 5,438,095.

[51] Int. Cl.$^6$ .............................. C08K 3/10; C08L 83/00
[52] U.S. Cl. ................. 524/785; 524/788; 524/789; 524/837; 524/863
[58] Field of Search ............................ 524/837, 863, 524/789, 788, 785

[56] References Cited

U.S. PATENT DOCUMENTS

| | | | |
|---|---|---|---|
| 3,294,725 | 12/1966 | Findlay et al. | 260/29.2 |
| 3,383,355 | 5/1968 | Cooper | 260/46.5 |
| 4,341,842 | 7/1982 | Lampe | 428/450 |
| 4,743,474 | 5/1988 | Homan | 427/387 |
| 4,888,380 | 12/1989 | Kamis et al. | 524/588 |
| 4,954,565 | 9/1990 | Liles | 524/860 |
| 5,017,672 | 5/1991 | Krahnke et al. | 528/23 |
| 5,037,878 | 8/1991 | Cerles et al. | 524/588 |
| 5,145,907 | 9/1992 | Kalinowski et al. | 524/789 |
| 5,321,075 | 6/1994 | Liles | 524/837 |

FOREIGN PATENT DOCUMENTS 0368500  5/1990  European Pat. Off. .

OTHER PUBLICATIONS

European Search Report of Jun. 17, 1996.

*Primary Examiner*—John C. Bleutge
*Assistant Examiner*—Karen A. Dean
*Attorney, Agent, or Firm*—Roger H. Borrousch

[57] ABSTRACT

An aqueous silicone emulsion which yields an elastomer upon removal of the water comprises a polydiorganosiloxane having alkoxysilyl endblocking groups with at least two alkoxy groups attached to the silicon atom, titanium catalyst, and optionally, a filler.

15 Claims, No Drawings

PRECURED SILICONE EMULSION

This is a continuation-in-part of application Ser. No. 08/113,029 filed on Aug. 30, 1993 now U.S. Pat. No. 5,438,095.

BACKGROUND OF THE INVENTION

1. Field of the Invention

This invention relates to an aqueous silicone emulsion which gives an elastomer when dried.

2. Background Information

Cooper discloses in U.S. Pat. No. 3,383,355, issued May 14, 1968, a method for preparing siloxane polymers having alkoxy groups bonded to terminal silicon atoms by reacting a hydroxylated organosiloxane polymer with an alkoxysilane in the presence of a suitable catalyst.

Findley et al. in U.S. Pat. No. 3,924,725, issued Dec. 27, 1966, describe a method for polymerizing organosiloxanes in emulsion using a surface active sulfonic acid catalyst. Their Example 16 mixes a hydroxyl endblocked dimethylpolysiloxane with an excess of methyltrimethoxysilane to give a methyldimethoxysilyl endblocked dimethylpolysiloxane which was then emulsified with a nonionic emulsifying agent. Dodecylbenzenesulfonic acid was added and allowed to react for an hour and then the emulsion was neutralized. Upon breaking the emulsion, a fluid was obtained which gelled rapidly. While in emulsion the fluid was not gelled.

Homan in U.S. Pat. No. 4,743,474, issued May 10, 1988, describes organopolysiloxane compositions which cure rapidly from the liquid to non-liquid state when exposed to moisture. The compositions contain a metal ester, dissolved in an organopolysiloxane fluid which has moisture-reactive, silicone-bonded alkoxysilylorganic radicals.

Kamis et al in U.S. Pat. No. 4,888,380, issued Dec. 19, 1989, describe a process for making a silicone sealant which is moisture curable. The process comprises mixing a polydiorganosiloxane having hydroxyl or alkoxy endblocking, an alkoxysilane, titanium catalyst, and reinforcing filler and storing in the absence of moisture.

Krahnke et al in U.S. Pat. No. 5,017,672, issued May 21, 1991, teach polyalkoxysilylalkylenedisilazane can be reacted with a silanol containing polyorganosiloxane to give a polyalkoxysilyl terminated polydiorganosiloxane.

SUMMARY OF THE INVENTION

An aqueous silicone emulsion which yields an elastomer upon removal of the water comprises an emulsion of a polydiorganosiloxane having at least four silicon-bonded alkoxy groups per molecule, sufficient titanium catalyst to crosslink the polydiorganosiloxane by reaction of the alkoxy groups, and optionally a filler.

This invention relates to an aqueous silicone emulsion which yields an elastomer upon removal of the water comprising the product obtained by mixing (A) 100 parts by weight of polydiorganosiloxane having alkoxysilyl endblocking groups with at least two alkoxy radicals attached to the silicon atom, and (B) sufficient titanium catalyst to crosslink the polydiorganosiloxane of (A), and thereafter adding water and ionic or nonionic stabilizer, emulsifying the resulting product, and obtaining the aqueous silicone emulsion.

DETAILED DESCRIPTION OF THE PREFERRED EMBODIMENTS

The aqueous silicone emulsion of this invention is unique in that the reactive groups which cause crosslinking of the polymer, so that an elastomer is formed upon removal of the water, are all present on the polymer ends and are not formed by a reaction of the polymer and another ingredient which is present to act as a crosslinker. Each terminal group of the polydiorganosiloxane (A) has either 2 or 3 alkoxy groups attached to silicon. When these polymers are mixed with a titanium catalyst in an amount sufficient to crosslink polydiorganosiloxane (A), and when water and an ionic or nonionic stabilizer is then added and the resulting mixture is emulsified, the polymer ends react with each other to form a crosslinked polymer within the emulsion micelles. When the water of the emulsion is removed, the crosslinked polymer particles coalesce to form an elastomer. This elastomer can be reinforced by the addition of filler.

The method used to make the aqueous silicone emulsions of this invention uses a polymer of the formula

where each R is a radical free of aliphatic unsaturation and is a radical selected from the group consisting of monovalent hydrocarbon, monovalent halohydrocarbon, and monovalent cyanoalkyl radicals of 1 to 18 inclusive carbon atoms, each D is selected from the group consisting of radicals of the formula

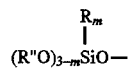

and radicals of the formula

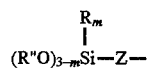

where each R" is a radical selected from the group consisting of methyl, ethyl, propyl, and butyl, Z is a divalent hydrocarbon radical or a combination of divalent hydrocarbon radicals and siloxane radicals, m is 0 or 1, x is of a value such that the polymer has a viscosity of from 0.5 to 3,000 Pa.s at 25° C., and R is as defined above.

When D of polymer (1) is the

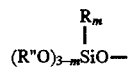

radical, the polymer is of the formula

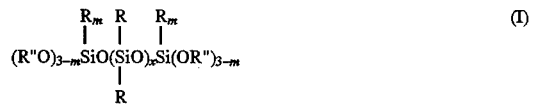

where each R is free of aliphatic unsaturation and is a radical selected from the group consisting of monovalent hydrocarbon, monovalent halohydrocarbon, and monovalent cyanoalkyl radicals of 1 to 18 inclusive carbon atoms, each R" is a radical selected from the group consisting of methyl, ethyl, propyl, and butyl, m is 0 or 1, and x is of a value such that the polymer has a viscosity of from 0.5 to 3,000 Pa.s at 25° C. R can be any of those monovalent hydrocarbon, monovalent halo-hydrocarbon, or monovalent cyano-alkyl radicals of 1 to 18 inclusive carbon atoms which are known to be useful in silicone sealant materials. The preferred radicals are methyl, ethyl, propyl, phenyl, and trifluoropropyl.

Alkoxy endblocked polydiorganosiloxanes are well known types of polymers. They can be prepared by the addition of an excess of alkyltrialkoxysilane to a hydroxy endblocked polydiorganosiloxane.

When (D) of polymer (1) is the

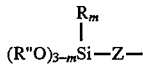

radical, the polymer is of the formula

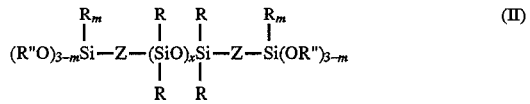

an alkoxysilalkylene endblocked polymer, where each R, each R", m, and x are as defined above, Z is a divalent hydrocarbon radical or combination of divalent hydrocarbon radicals and siloxane radicals. The divalent hydrocarbon radical can be from 2 to 15 carbon atoms in the form of a divalent alkylene or arylene radical such as ethylene, propylene, hexylene, phenylene, and

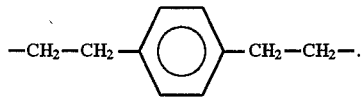

A preferred Z may be represented by the formula

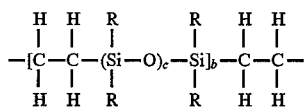

where R is as defined above, b is 0 or 1, and c is from 1 to 6. The preferred viscosity of polymer (1) is from 1 to 1,000 Pa.s at 25° C.

Alkoxysilalkylene endblocked polymers of the above formula can be manufactured following the methods taught by Kamis et al in U.S. Pat. No. 4,888,380, issued Dec. 19, 1989, which patent is hereby incorporated by reference to show these polymers and their method of manufacture.

The polydiorganosiloxane compositions of this invention are crosslinked by the use of a titanium catalyst, (B). The titanium catalyst can be those known to be useful in catalyzing the moisture induced reaction of alkoxy-containing siloxanes or silanes. Preferred are titanium catalysts such as titanium esters, the tetraalkyltitanates such as tetrabutyltitanate, tetraisopropyltitanate, tetra-2-ethylhexyltitanate, tetraphenyltitanate, triethanolaminetitanate, organosiloxytitanium compounds such as those described by Weyenberg in U.S. Pat. No. 3,294,739, issued Dec. 27, 1966, and beta-dicarbonyl titanium compounds, such as those described by Weyenberg in U.S. Pat. No. 3,334,067, issued Aug. 1, 1967, both patents being herein incorporated by reference to show titanium catalyst and methods of manufacture. Preferred catalysts include tetrabutyltitanate, tetraisopropyltitanate, bis-(acetylacetonyl)diisopropyltitanate, and 2,5-diisopropoxy-bis(ethylacetoacetate)titanium. The amount of catalyst is from 0.2 to 6.0 parts by weight per 100 parts by weight of polydiorganosiloxane (A). Preferred amounts are from 0.5 to 3.0 parts by weight per 100 parts by weight of polydiogano-siloxane (A).

The polydiorganosiloxane (A) is mixed with the titanium catalyst (B) before the polymer is emulsified. When the titanium catalyst is a tetraalkoxytitanate, it is essential that the polydiorganosiloxane and the tetraalkoxytitanate be combined prior to contact with water and stabilizing agents. If (A) and (B) are not mixed prior to emulsification when the titanium catalyst is a tetraalkoxytitanate, the micelles of the emulsion are not crosslinked and the emulsion does not form a cured silicone elastomer upon evaporation of the water. However, if the titanium catalyst is a beta-dicarbonyl titanium compound, the titanium catalyst can be added either prior to the emulsification of the polydiorganosilexane, or after the emulsification of it as described and claimed in our copending application Ser. No. 08/113,029, filed Aug. 30, 1993. The tetraalkoxytitanate is sensitive to water and is inactivated as a catalyst when contacted with water before it is combined with the polydiorganosiloxane, whereas the beta-dicarbonyl titanium compound is not so limited.

Some of the titanium catalysts are not readily soluble in the polydiorganosiloxanes and in those situations, an organic solvent which is non-reactive with the titanium catalyst can be used to bring the ingredients into a state of solution where they can react with one another. These non-titanium catalyst-reactive organic solvents include toluene, n-hexane, and n-heptane. Because they are not desirable from an ecological and marketing point of view, it is desired that they be removed, and therefore, the amount of such organic solvent should be the minimum to do the job and be economically removed.

After the polydiorganosiloxane and the titanium catalyst are formed into a mixture, it can be emulsified by conventional techniques known in the art for such purposes. The mixture of polydiorganosiloxane and titanium catalyst is emulsified by first adding water and a stabilizer and then the resulting mixture is mechanically emulsified, such as with a high speed mixer, or an ultrasonic probe-type processor. After the aqueous silicone emulsion is obtained, if an organic solvent was used, it is preferred that it be removed. The removal of organic solvent from the aqueous silicone emulsion can be accomplished by heating the emulsion, especially practical are those techniques which use thin layers of the emulsion while applying heat. During this process of the organic solvent removal, water can be lost, and if this is the case, additional water may be desirably added to bring the aqueous silicone emulsion back to its intended solids content. However, this is not a requirement of this invention, because emulsions of various solids can make useful products. Likewise, one may wish to use a more diluted form of the aqueous silicone emulsion and therefore, additional water may be added over and above the amount lost during organic solvent removal.

The ionic and non-ionic stabilizers can be those which are conventionally used for stabilizing silicone emulsions, such as sodium lauryl sulfate and polyethylene oxide lauryl ether.

Useful silicone elastomeric compositions are commonly produced with a filler as one of the ingredients. These fillers are well known in the industry. They are added to the mixture to provide reinforcement of the polymer so as to control the physical properties of the elastomer which is formed. The addition of the filler can be done at various points during the manufacture of the aqueous silicone emulsion, preferably after the aqueous silicone emulsion is prepared. Reinforcing fillers, such as fumed silica, precipitated silica, and diatomaceous earth are used to give the highest physical strengths to the elastomer. Reinforcing fillers are generally recognized as being very fine particles having a surface area from about 50 to 700 m²/g. These fillers may be used with untreated filler surfaces or with treated filler surfaces, the treatment being used to modify the filler surface so that it properly interacts with the polymer and the other ingredients in the sealant. Calcium carbonate fillers are now available which are produced by precipitation, which have a surface area of about 20 m²/g, which have a reinforcing effect. Extending fillers such as titanium dioxide, zirconium silicate, ground calcium carbonate, iron oxide, ground quartz, and carbon black may be used. The amounts of filler used can obviously be varied within wide limits in accordance with the intended use. For example, in some cases the crosslinked polymer could be used with no filler, but it would have very low physical properties. Reinforcing fillers are commonly used in amounts from about 5 to 20 parts by weight to give the highest physical properties, such as tensile strength. Extending fillers are finely ground with usual average particle sizes in the range of from about 1 to 10 micrometers. Extending fillers are used to modify the sealant properties and to provide opacity in some cases. When silica is used as the filler there is no problem with the shelf life of the emulsion; unlike those compositions which include polymer, silica, and stannic tin catalyst.

Another type of reinforcement is colloidal silica in the form of an aqueous dispersion, such as the NALCOAG dispersions of Nalco Chemical Company. A separately prepared anionic, stable dispersion of fumed silica in water is available as CAB-O-SPERSE dispersions from the Cab-O-Sil division of Cabot Corporation. These fillers are added after the aqueous silicone emulsion is prepared because they contain water which can inactivate the titanium catalyst, especially the tetraalkyltitanate catalysts.

The composition of this invention can be used as a coating for protection or release when applied to surfaces such as cloth or paper and dried. When the composition includes filler it can be used to form paints and sealants, depending upon the amount and type of filler added. In all cases, the composition gives an elastomeric material upon removal of the water and has excellent shelf life as an emulsion before drying.

The following examples are included for illustrative purposes only and should not be construed as limiting the invention which is properly set forth in the appended claims.

EXAMPLE 1

First, 4 g of n-hexane and 0.2 g of tetrabutyltitanate (TBT) was added to 20 g of the methyldimethoxysiloxy endblocked polydimethylsiloxane fluid having a viscosity of about 11.5 Pa.s at 25° C. and the mixture was shaken until a solution resulted. Then, 1.2 g of a 30 percent aqueous solution of sodium lauryl sulfate was added followed by 14.8 g of deionized water. The mixture was emulsified for 2.5 minutes using an ultrasonic probe-type processor. The resulting emulsion was allowed to stand for 24 hours after which n-hexane was removed by heating the emulsion to 60° C. under vacuum for one hour using a rotary evaporator.

Additional water was added to the emulsion to replace that water that had been removed by evaporation during the removal of the n-hexane; the resulting composition consisted of an approximately 60 weight percent solids emulsion of precured polydimethylsiloxane. A film was cast by pouring 8 g of the emulsion into a 100 mm diameter polystyrene Petri dish and allowing the emulsion to dry at ambient conditions for 24 hours. An elastomeric film resulted.

After the film had dried at ambient conditions for an additional 6 days, swell/gel properties were determined by swelling the elastomeric film in n-hexane. The cured latex had a volume swell of 912 +/− 27 percent and a gel content of 85.6 +/− 0.6 percent.

COMPARISON EXAMPLE 1

A mixture of 30 g of reaction product containing about 90 percent by weight of trimethoxysilylethylene endblocked polydimethylsiloxane having a viscosity of about 50 Pa.s at 25° C. and 10 percent unreacted ingredients, predominately vinyl endblocked polydimethylsiloxane, was mixed with 3.5 g of an aqueous mixture of sodium lauryl sulfate (44 percent in water) and the mixture was agitated for 1 minute under vacuum in a high speed mixer (WHIP MIX (R)). Next 4 g of deionized water was added to the mixture and stirred for 1 minute. Then, 0.45 g of diisopropyl-bis-(ethylacetoacetate)titanium was added to the mixture and it was stirred for 1 minute under vacuum. This mixture was an anionic, oil in water emulsion of alkoxy functional polydimethylsiloxane fluid of approximately 80 weight percent solids. This aqueous silicone emulsion is further described and claimed in copending application Ser. No. 08/113,029, filed Aug. 30, 1993. It had a paste-like consistency. The catalyzed emulsion was allowed to stand undisturbed in a closed container for one week. During this time, portions of the emulsion were removed from the container after 1 hour, 1 day, 2 days, and 7 days and smeared onto a plastic dish and allowed to dry. The resulting films were inspected after drying for 24 hours in air. Only the film which had stood for 7 days before drying was elastomeric. The properties of this film were measured after it had dried for a total of 4 days. The tensile properties are given in Table I.

TABLE I

|  | MPa | psi |
| --- | --- | --- |
| Tensile Strength | 0.29 | 42 |
| 50 percent Modulus | 0.02 | 3 |
| 100 percent Modulus | 0.03 | 5 |
| 150 percent Modulus | 0.05 | 7 |
| 200 percent Modulus | 0.07 | 10 |
| 250 percent Modulus | 0.08 | 12 |
| 300 percent Modulus | 0.1 | 14 |

COMPARISON EXAMPLE 2

First 90 g of methyldimethoxysiloxy endblocked polydimethylsiloxane fluid having a viscosity of about 11.5 Pa.s at 25° C. was added to 10 g of an aqueous mixture of sodium lauryl sulfate (50 percent in water) and the mixture was agititated for 1 minute under vacuum in a high speed mixer (WHIP MIX (R)). Next 4 g of deionized water was added to this mixture and it was stirred again for 1 minute, also in vacuo. An additional 4 g of deionized water was added and the mixture was stirred in vacuo for 1 minute. The resulting composition consisted of an anionically stabilized, oil in water emulsion having a solids content of approximately 84 percent by weight. Average particle size of the emulsion micelles were determined (NIACOMP) and found to be 1600 nm.

A 30 g portion of the emulsion was placed into a jar followed by 0.48 g of diisopropyl-bis-(ethylacetoacetate) titanium. The mixture was stirred with a spatula for several minutes until the emulsion had a homogeneous appearance. The jar was capped and the emulsion was allowed to stand undisturbed. After 4 hours, a small amount of emulsion was removed and spread into a film. The film was allowed to dry in air for 16 hours. It was inspected and found to be slightly elastomeric. Another sample of the catalyzed emulsion was removed after it had stood undisturbed for 20 hours and this sample was spread into a thin film and allowed to dry for 20 hours. The resulting film was elastomeric.

The film was allowed to dry in air for a total of 7 days then it was allowed to swell (1 inch disks) in heptane for 6 days. Volume swell and gel content were determined:

Volume Swell=933%

% Gel=84.8%

Tensile properties of the film were also obtained after it had dried for a total of 7 days and these were as shown in table II.

TABLE II

| Property | Tensile MPa | Tensile psi | Elongation % | 50% M MPa | 50% M psi | 100% M MPa | 100% M psi | 200% M MPa | 200% M psi |
|---|---|---|---|---|---|---|---|---|---|
| Value | 0.60 | 87 | 385 | 0.15 | 22 | 0.25 | 36 | 0.37 | 54 |
| Standard deviation | 0.1 | 14 | 1 | 0.007 | 1 | 0.014 | 2 | 0.04 | 6 |

COMPARISON EXAMPLE 3

A mixture of 30 g of reaction product containing about 90 percent by weight of trimethoxysilylethylene endblocked polydimethylsiloxane having a viscosity of about 50 Pa.s at 25° C. and 10 percent unreacted ingredients, predominately vinyl endblocked polydimethylsiloxane, was mixed with 3.5 g of an aqueous mixture of sodium lauryl sulfate (44 percent in water) and the mixture was agitated for 1 minute under vacuum in a high speed mixer (WHIP MIX (R)). Next 4 g of deionized water was added to the mixture and stirred for 1 minute. Then, 0.45 g of tetrabutyltitanate was added to the mixture and it was stirred for one minute under vacuum. This mixture was an anionic, oil in water emulsion of alkoxy functional polydimethylsiloxane fluid of approximately 80 weight percent solids. The paste-like emulsion was allowed to stand undisturbed in a closed container for one week. During this time, portions of the emulsion were removed from the container after 1 hour, 1 day, 2 days, and 7 days and spread into a film onto a plastic dish. The films were allowed to dry under ambient conditions for 24 hours after which they were inspected. None of the films had cured. The films consisted of tacky polymeric gums that were not elastomeric and they were soluble in heptane.

The above experiment was repeated two more times using 1.0 g and 1.5 g of tetrabutyltitanate respectively. These concentrations of tetrabutyltitanate resulted in the same uncured films as did the 0.45 g of tetrabutyltitanate. These experiments demonstrated that the tetrabutyltitanate, a tetraalkyltitanate, is incapable of curing an alkoxy-functional polydiorganosiloxane emulsion using the method of adding the titanium catalyst to the aqueous emulsion of the polydiorganosiloxane. It is believed that the tetrabutyltitanate becomes inactivated by the aqueous phase before it can migrate into the polydiorganosiloxane micelles and function as a curing catalyst. Thus, tetraalkyltitanates function differently than the beta-dicarbonyl titanium compounds, such as illustrated by Comparison Example 1 and Comparison Example 2.

That which is claimed is:

1. An aqueous silicone emulsion which yields an elastomer upon removal of the water comprising the product obtained by mixing (A) 100 parts by weight of polydiorganosiloxane having alkoxysilyl endblocking groups with at least two alkoxy radicals attached to the silicon atom, and (B) sufficient titanium catalyst selected from the group consisting of titanium esters, organosiloxy titanium compounds, and beta-dicarbonyl titanium compounds to crosslink the polydiorganosiloxane of (A), and thereafter adding water and ionic or non-ionic stabilizer, emulsifying the resulting product, and obtaining the aqueous silicone emulsion.

2. The emulsion of claim 1 in which there is from 0.2 to 6 parts of titanium catalyst.

3. The emulsion of claim 1 in which the polydiorganosiloxane of (A) is an alkoxysilethylene endblocked polydiorganosiloxane.

4. The emulsion of claim 1 in which the polydiorganosiloxane of (A) is a polydiorganosiloxane having

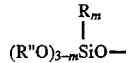

endblocking.

5. The emulsion of claim 3 in which there is from 0.2 to 6 parts of titanium catalyst and further comprising a filler.

6. The emulsion of claim 4 in which there is from 0.2 to 6 parts of titanium catalyst and further comprising a filler.

7. The emulsion of claim 5 in which the filler is a reinforcing filler.

8. The emulsion of claim 6 in which the filler is a reinforcing filler.

9. The emulsion of claim 7 in which the reinforcing filler is present in an amount of from 5 to 20 parts by weight per 100 parts by weight of polydiorganosiloxane.

10. The emulsion of claim 8 in which the reinforcing filler is present in an amount of from 5 to 20 parts by weight per 100 parts by weight of polydiorganosiloxane.

11. An aqueous silicone emulsion which yields an elastomer upon removal of the water comprising the product obtained by mixing an organic solvent which is non-reactive with tetraalkyltitanate, a tetraalkyltitanate, and a polydiorganosiloxane having alkoxysilyl endblocking groups with at least two alkoxy radicals attached to the silicon atom, thereafter adding an ionic or non-ionic stabilizer and water, emulsifying the resulting mixture, and removing the organic solvent to obtain the aqueous silicone emulsion.

12. The emulsion of claim 11 in which the organic solvent is n-hexane, the tetraalkyltitanate is tetrabutyltitanate, the polydiorganosiloxane is methyl(dimethoxy)siloxy endblocked polydimethylsiloxane, and the stabilizer is sodium lauryl sulfate.

13. The emulsion of claim 11 further comprising adding water sufficient to replace water lost during the removal of the organic solvent.

14. The emulsion of claim 12 further comprising adding water sufficient to replace water lost during the removal of the n-hexane.

15. The emulsion of claim 1 in which the alkoxysilyl endblocking group is selected from the group consisting of radicals of the formula

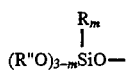

and radicals of the formula

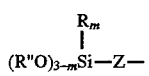

where each R is a radical free of aliphatic unsaturation and is a radical selected from the group consisting of monovalent hydrocarbon, monovalent halohydrocarbon, and monovalent cyanoalkyl radicals of 1 to 18 inclusive carbon atoms, each R" is a radical selected from the group consisting of methyl, ethyl, propyl, and butyl, Z is a divalent hydrocarbon radical or a combination of divalent hydrocarbon radicals and siloxane radicals, and m is 0 or 1.

* * * * *